US007622202B2

(12) United States Patent
Maeda et al.

(10) Patent No.: US 7,622,202 B2
(45) Date of Patent: Nov. 24, 2009

(54) SOFT MAGNETIC MATERIAL, POWDER MAGNETIC CORE, METHOD FOR MANUFACTURING SOFT MAGNETIC MATERIAL, AND METHOD FOR MANUFACTURING POWDER MAGNETIC CORE

(75) Inventors: Toru Maeda, Itami (JP); Kazuyuki Maeda, Osaka (JP); Yasushi Mochida, Osaka (JP); Koji Mimura, Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/793,984

(22) PCT Filed: Jul. 19, 2006

(86) PCT No.: PCT/JP2006/314263

§ 371 (c)(1), (2), (4) Date: Jun. 25, 2007

(87) PCT Pub. No.: WO2007/034615

PCT Pub. Date: Mar. 29, 2007

(65) Prior Publication Data

US 2008/0044679 A1 Feb. 21, 2008

(30) Foreign Application Priority Data

Sep. 21, 2005 (JP) ............................ 2005-274124

(51) Int. Cl.
*B32B 15/00* (2006.01)

(52) U.S. Cl. .................. 428/692.1; 428/693.1; 428/405

(58) Field of Classification Search ....................... None
See application file for complete search history.

(56) References Cited

U.S. PATENT DOCUMENTS 5,178,947 A 1/1993 Charmot et al.

(Continued)

FOREIGN PATENT DOCUMENTS

JP 04-356527 12/1992

(Continued)

OTHER PUBLICATIONS

Patent Abstracts of Japan, Publication No. 2000-003824 dated Jan. 7, 2000 (1 page).

(Continued)

*Primary Examiner*—D. Lawrence Tarazano
*Assistant Examiner*—Gary D. Harris
(74) *Attorney, Agent, or Firm*—Osha • Liang LLP

(57) ABSTRACT

A soft magnetic material includes a plurality of composite magnetic particles (40) each including a metal magnetic particle (10) and an insulation coating (20) covering the surface of the metal magnetic particle (10), wherein the insulation coating (20) contains Si (silicon), and 80% or more of Si contained in the insulation coating constitutes a silsesquioxane skeleton. Therefore, it is possible to effectively decrease a hysteresis loss while suppressing an increase in eddy-current loss.

6 Claims, 3 Drawing Sheets

U.S. PATENT DOCUMENTS

| | | | | |
|---|---|---|---|---|
| 5,202,175 | A * | 4/1993 | Paz-Pujalt | 428/142 |
| 5,540,981 | A * | 7/1996 | Gallagher et al. | 428/220 |
| 2004/0247939 | A1 * | 12/2004 | Toyoda | 428/692 |
| 2005/0153136 | A1 * | 7/2005 | Guschl | 428/403 |
| 2005/0233068 | A1 * | 10/2005 | Yoshimura et al. | 427/127 |
| 2006/0068196 | A1 * | 3/2006 | Suenaga et al. | 428/328 |

FOREIGN PATENT DOCUMENTS

| | | |
|---|---|---|
| JP | 07-254522 | 10/1995 |
| JP | 2000-003824 | 1/2000 |
| JP | 2003-303711 | 10/2003 |
| JP | 2004-143554 | 5/2004 |
| JP | 2006-005173 | 1/2006 |
| JP | 2006-024869 | 1/2006 |
| WO | WO 2005/083725 A1 | 9/2005 |

OTHER PUBLICATIONS

Patent Abstracts of Japan, Publication No. 04-356527 dated Dec. 10, 1992 (1 page).

Patent Abstracts of Japan, Publication No. 2006-005173 dated Jan. 5, 2006 (1 page).

Patent Abstracts of Japan, Publication No. 2006-024869 dated Jan. 26, 2006 (1 page).

Patent Abstracts of Japan, Publication No. 2003-303711 dated Oct. 24, 2003 (1 page).

Patent Abstracts of Japan, Publication No. 2004-143554 dated May 20, 2004 (1 page).

Patent Abstracts of Japan, Publication No. 07-254522 dated Oct. 3, 1995 (1 page).

International Search Report issued in PCT/JP2006/314263 mailed Oct. 24, 2006 (2 pages).

Office Action dated Jun. 27, 2008 issued by the State Intellectual Property Office of the People's Republic of China, with English translation, 9 pages.

* cited by examiner

SOFT MAGNETIC MATERIAL, POWDER MAGNETIC CORE, METHOD FOR MANUFACTURING SOFT MAGNETIC MATERIAL, AND METHOD FOR MANUFACTURING POWDER MAGNETIC CORE

TECHNICAL FIELD

The present invention relates to a soft magnetic material, a powder magnetic core, a method for manufacturing a soft magnetic material, and a method for manufacturing a powder magnetic core.

BACKGROUND ART

In electric equipment including a solenoid valve, a motor, or an electric circuit, soft magnetic materials manufactured by powder metallurgy are used. The soft magnetic materials each include a plurality of composite magnetic particles each including a metal magnetic particle composed of, for example, pure iron, and an insulation coating composed of, for example, a phosphate, which covers the surface of the metal magnetic particle. From the requirement for improving energy conversion efficiency and decreasing heat generation, the soft magnetic materials are required to have the magnetic property that a high magnetic flux density can be obtained by applying a small magnetic field and the magnetic property that the energy loss due to a change in the magnetic flux density is small.

When a powder magnetic core formed using such a soft magnetic material is used in an AC magnetic field, an energy loss referred to as an "iron loss" occurs. The iron loss is represented by a total of a hysteresis loss and an eddy-current loss. The hysteresis loss is an energy loss produced by the energy necessary for changing the magnetic flux density of a soft magnetic material, and the eddy-current loss is an energy loss produced by an eddy current flowing between the metal magnetic particles constituting the soft magnetic material. The hysteresis loss is proportional to an operating frequency, and the eddy-current loss is proportional to the square of the operating frequency. Therefore, the hysteresis loss becomes dominant in a low frequency region, and the eddy-current loss becomes dominant mainly in a high frequency region. The powder magnetic core is required to have the magnetic property of decreasing the occurrence of an iron loss, i.e., high AC magnetic properties.

In order to decrease the hysteresis loss of the iron loss of a soft magnetic material, distortion and displacement in the metal magnetic particles may be removed to facilitate the movement of magnetic walls and decrease the coercive force Hc of the soft magnetic material. In order to sufficiently remove distortion and displacement in the metal magnetic particles, it is necessary to heat-treat the soft magnetic material at a high temperature, for example, 400° C. or more, preferably 600° C. or more, and more preferably 800° C. or more.

However, the heat resistance of an insulation coating of a commonly used iron powder with insulation coating is as low as about 400° C., and thus the insulation of the insulation coating is lost by heat-treating the soft magnetic material at a high temperature. Therefore, there is the problem that when the hysteresis loss is decreased, the electric resistivity ρ of the soft magnetic material is decreased to increase the eddy-current loss. In particular, electric equipment has been recently required to have a smaller size, higher efficiency, and higher output, and electric equipment is required to be used in a high-frequency region in order to satisfy these requirements. An increase in the eddy-current loss in a high-frequency region interferes with a decrease in size and increases in efficiency and output of electric equipment.

Therefore, the heat resistance of a soft magnetic material has been conventionally improved by forming an insulation coating composed of silicone of the composition formula $(R_2SiO)_n$ on the surface of a metal magnetic particle. Silicone has excellent insulation and heat resistance and can maintain insulation and heat resistance as a silica amorphous material $(Si—O_x)_n$ even when decomposed by heat treatment at a high temperature. Therefore, when an insulation coating composed of silicone is formed, the insulation of an insulation coating can be suppressed from deteriorating by heat treatment of a soft magnetic material at a high temperature of about 550° C., thereby suppressing an increase in the eddy-current loss of the soft magnetic material. Since silicone has excellent deformation followingness and has the function as a lubricant, a soft magnetic material having an insulation coating composed of silicone is advantageous in that the moldability is excellent, and the insulation coating is not easily broken during molding.

A technique for forming an insulation coating composed of silicone on the surface of a metal magnetic particle is disclosed in, for example, Japanese Unexamined Patent Application Publication No. 7-254522 (Patent Document 1), Japanese Unexamined Patent Application Publication No. 2003-303711 (Patent Document 2), and Japanese Unexamined Patent Application Publication No. 2004-143554 (Patent Document 3).

Patent Document 1: Japanese Unexamined Patent Application Publication No. 7-254522

Patent Document 2: Japanese Unexamined Patent Application Publication No. 2003-303711

Patent Document 3: Japanese Unexamined Patent Application Publication No. 2004-143554

DISCLOSURE OF INVENTION

Problem to be Solved by the Invention

However, an insulation coating composed of silicone has insufficient heat resistance. The heat treatment of a conventional soft magnetic material at a high temperature, for example, 600° C., causes the problem of breaking an insulation coating composed of silicone (decreasing insulation), thereby increasing the eddy-current loss. Therefore, a conventional soft magnetic material has the problem that its hysteresis loss cannot be effectively decreased while suppressing an increase in eddy-current loss.

Also, since an insulation coating composed of silicone does not have sufficient hardness, there is the problem that the strength of a powder magnetic core obtained by molding a soft magnetic material under pressure cannot be improved.

Accordingly, an object of the present invention is to provide a soft magnetic material, a powder magnetic core, a method for manufacturing a soft magnetic material, and a method for manufacturing a powder magnetic core, which are capable of effectively decreasing a hysteresis loss while suppressing an increase in eddy-current loss.

Another object of the present invention is to provide a soft magnetic material, a powder magnetic core, a method for manufacturing a soft magnetic material, and a method for manufacturing a powder magnetic core, which are capable of producing a powder magnetic core with high strength and a low hysteresis loss.

Means for Solving the Problem

A soft magnetic material of the present invention includes a plurality of composite magnetic particles each having a metal magnetic particle and an insulation coating which covers the surface of the metal magnetic particle, the insulation coating containing Si (silicon), and 80% or more of Si contained in the insulation coating constituting a silsesquioxane skeleton.

In an aspect of the present invention, a powder magnetic core includes a plurality of composite magnetic particles each having a metal magnetic particle and an insulation coating which covers the surface of the metal magnetic particle, the insulation coating containing Si (silicon), and 80% or more of Si contained in the insulation coating constituting a silsesquioxane skeleton and a silica skeleton represented by $(Si—O_x)_n$ wherein x=1.5.

A method for manufacturing a soft magnetic material of the present invention includes the step of forming an insulation coating on a metal magnetic particle, 80% or more of Si contained in the insulation coating constituting a silsesquioxane skeleton.

The inventors of the present invention found the cause of a decrease in insulation due to heat treatment of an insulation coating composed of silicone at a high temperature. A silicone polymer basically has a one-dimensional structure (structure including as a base a skeleton in which two of the four bonds of a Si atom are bonded to Si through oxygen atoms), and thus the density of Si—O—Si chains is low. Therefore, when a soft magnetic material is heat-treated at a high temperature (e.g., a temperature higher than 550° C.), the constituent atoms of the metal magnetic particles diffuse into the insulation coatings to decease the insulation of the insulation coatings. Since silicone contains many organic components, silicone is thermally decomposed by heat treatment of the soft magnetic material to decrease the thickness of the insulation coating and the insulation of the insulation coating. Furthermore, the insulation coating exhibits conductivity by carbonization, thereby further decreasing the insulation. Due to these factors, the insulation between metal magnetic particles cannot be maintained, thereby increasing an eddy-current loss by heat treatment.

On the other hand, in the present invention, 80% or more of Si contained in the insulation coating constitutes a silsesquioxane skeleton (skeleton in which three of the four bonds of a Si atom are bonded to Si through oxygen atoms). Since a silsesquioxane polymer has a two- or three-dimensional structure, the density of a Si—O (oxygen)-Si chain is higher than that of silicone. Therefore, the diffusion of the constituent atoms of the metal magnetic particles into the insulation coatings can be suppressed as compared with silicone. Furthermore, the content of organic components in silsesquioxane is lower than that of silicone. Therefore, when the soft magnetic material is heat-treated, the thickness of the insulation coating is not much decreased, and carbon atoms are little produced, thereby suppressing a decrease in insulation of the insulation coating. Furthermore, silsesquioxane before heat treatment has the same degree of deformation followingness as silicone, and thus the soft magnetic material can be formed without damaging the insulation coating.

Therefore, since 80% or more of Si contained in the insulation coating constitutes a silsesquioxane skeleton, the heat resistance of the insulation coating is improved. As a result, the hysteresis loss can be decreased while suppressing an increase in eddy-current loss.

Since the heat resistance (the ability of suppressing diffusion of the constituent metal elements of the soft magnetic particles) of the insulation coating is improved, the insulation between the metal magnetic particles can be secured even when the thickness of the insulation coating is deceased. As a result, it is possible to attempt to increase the density of a powder magnetic core and thus decrease the hysteresis loss and improve magnetic permeability.

In addition, silsesquioxane after heat treatment (curing/decomposition) has higher hardness than that of silicone after heat treatment (curing/decomposition), and thus a powder magnetic core having sufficient strength can be obtained. This is because as the structure (density) of a Si—O—Si chain is more close to crystalline silica ($SiO_2$), hardness is increased to improve the strength of the powder magnetic core.

In the soft magnetic material of the present invention, the average thickness of the insulation coating is preferably 10 nm to 1 μm.

When the average thickness of the insulation coating is 10 nm or more, the insulation between the metal magnetic particles can be secured. When the average thickness of the insulation coating is 1 μm or less, shear fracture of the insulation coating can be prevented in pressure molding. Since the ratio of the insulation coating to the soft magnetic material is not excessively high, it is possible to prevent a significant decrease in magnetic flux density of the powder magnetic core obtained by pressure-molding the soft magnetic material.

In the soft magnetic material of the present invention, each of a plurality of composite magnetic particles preferably further has an undercoating formed between the metal magnetic particle and the insulation coating. The undercoating is composed of an insulating amorphous compound.

As a result, adhesion between the metal magnetic particle and the insulation coating can be improved. In addition, the moldability of the soft magnetic material can be improved because the amorphous compound is excellent in deformation followingness.

In the soft magnetic material of the present invention, the undercoating preferably includes an amorphous compound of a phosphate, an amorphous compound of a borate, or an amorphous compound of an oxide of at least one selected from the group consisting of Al (aluminum), Si, Mg (magnesium), Y (yttrium), Ca (calcium), Zr (zirconium), and Fe (iron), or a mixture of these compounds.

These materials are excellent in insulation and deformation followingness and has the excellent effect of coupling a metal and an organic compound, and are thus suitable for the undercoating.

In the soft magnetic material of the present invention, the average thickness of the undercoating is preferably 10 nm to 1 μm.

When the average thickness of the undercoating is 10 nm or more, it is possible to prevent the occurrence of breakage due to nonuniform coating or physical damage in a coating process. When the average thickness of the undercoating is 1 μm or less, shear fracture of the undercoating can be prevented in pressure molding. Since the ratio of the insulation coating to the soft magnetic material is not excessively high, it is possible to prevent a significant decrease in magnetic flux density of the powder magnetic core obtained by pressure-molding the soft magnetic material.

In another aspect of the present invention, a powder magnetic core is manufactured using the soft magnetic material.

In a further aspect of the present invention, a method for manufacturing a powder magnetic core includes a pressure molding step of pressure-molding the soft magnetic material manufactured by the method for manufacturing the soft magnetic material, and a step of thermally curing the insulation coating composed of silsesquioxane after the pressure molding step.

In a further aspect of the present invention, a method for manufacturing a powder magnetic core includes a pressure molding step of pressure-molding, in a heated mold, the soft magnetic material manufactured by the method for manufacturing the soft magnetic material and, at the same time, thermally curing the insulation coating composed of silsesquioxane.

According to the method for manufacturing the powder magnetic core of the present invention, it is possible to decrease a hysteresis loss while suppressing an increase in eddy-current loss. In addition, a powder magnetic core with high strength can be obtained. Furthermore, since the insulation coating composed of silsesquioxane is thermally cured at the same time as or after the pressure molding step, the soft magnetic material can be pressure-formed in a state where the insulation coating composed of silsesquioxane has excellent deformation followingness.

Advantage of the Invention

By using the soft magnetic material, the powder magnetic core, the method for manufacturing the soft magnetic material, and the method for manufacturing the powder magnetic core of the present invention, it is possible to effectively decrease a hysteresis loss while suppressing an increase in eddy-current loss. In addition, a powder magnetic core with high strength and a low hysteresis loss can be obtained.

REFERENCE NUMERALS

10, 110 metal magnetic particle, 20, 120 insulation coating, 30, 130 undercoating, 40 composite magnetic particle, 45 lubricant, 50 distortion.

BEST MODE FOR CARRYING OUT THE INVENTION

An embodiment of the present invention will be described below with reference to the drawings.

Figure 1:
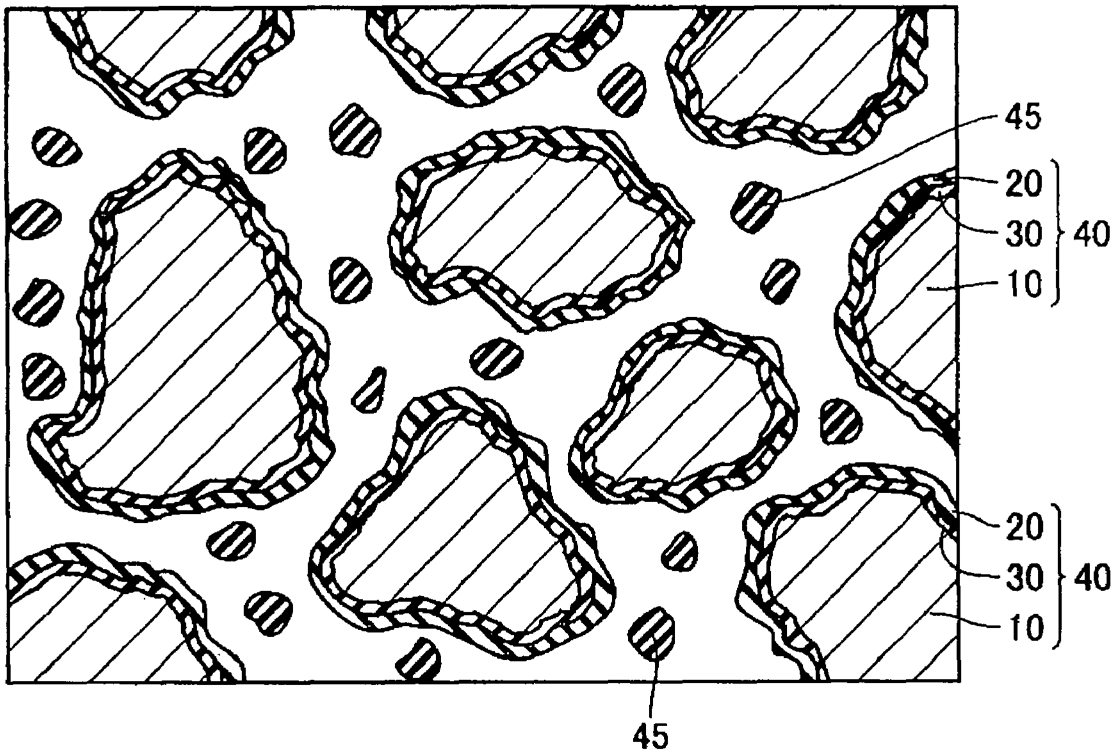
FIG. 1 is a drawing schematically showing a soft magnetic material according to an embodiment of the present invention.

FIG. 1 is a sectional view schematically showing a soft magnetic material according to an embodiment of the present invention. Referring to FIG. 1, the soft magnetic material of this embodiment includes a plurality of composite magnetic particles 40 each including a metal magnetic particle 10, an insulation coating 20 which covers the surface of the metal magnetic particle 10, and an undercoating 30 formed between the metal magnetic particle 10 and the insulation coating 20. Besides the composite magnetic particles 40, the soft magnetic material may further include a lubricant 45.

Figure 2:
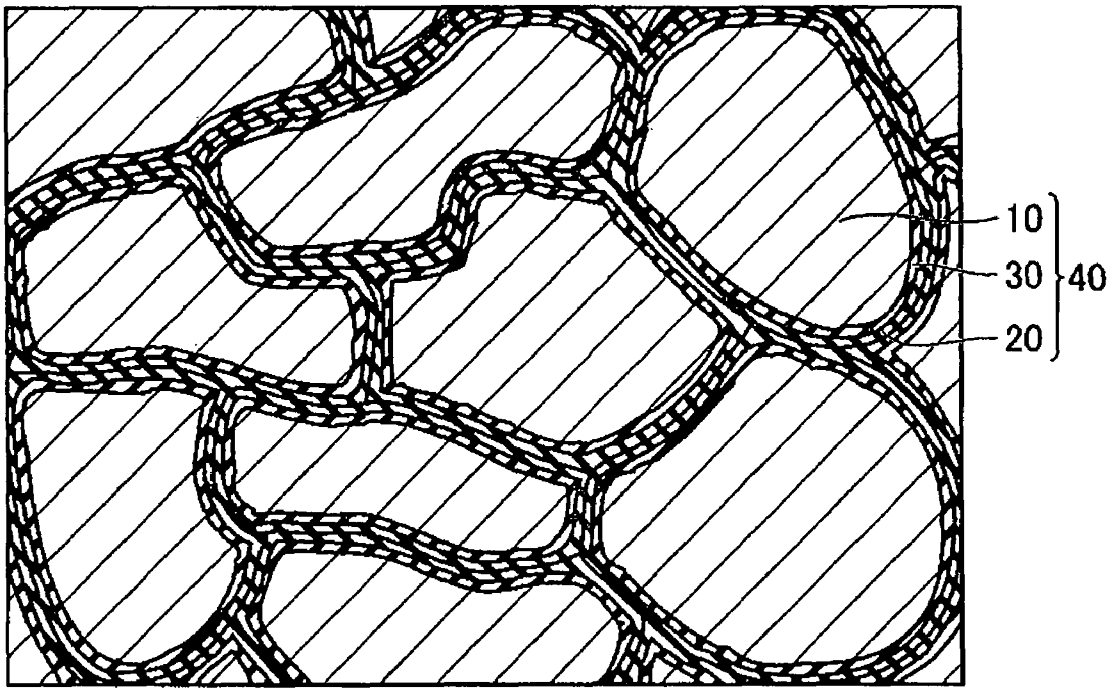
FIG. 2 is a sectional view schematically showing a powder magnetic core according to an embodiment of the present invention.

FIG. 2 is a sectional view schematically showing a powder magnetic core according to an embodiment of the present invention. The powder magnetic core shown in FIG. 2 is manufactured by pressure molding and heat treatment of the soft magnetic material shown in FIG. 1. Referring to FIGS. 1 and 2, in the powder magnetic core of this embodiment, the plurality of composite magnetic particles 40 are bonded together by engagement of irregularities possessed by the composite magnetic particles 40.

In the soft magnetic material shown in FIG. 1 and the powder magnetic core shown in FIG. 2, the insulation coating 20 contains Si. In the soft magnetic material shown in FIG. 1, 80% or more of Si contained in the insulation coating 20 constitutes a silsesquioxane skeleton. In the powder magnetic core shown in FIG. 2, 80% or more of Si contained in the insulation coating 20 constitutes a silsesquioxane skeleton and a silica skeleton represented by $(Si—O_x)_n$ wherein $x=1.5$. The term "silsesquioxane" is a generic term of polysiloxane having the structural formula 1 below. As shown in the structural formula, a skeleton in which three bonds of the four bonds of a Si atom are bonded to Si atoms through oxygen atoms is referred to as a "silsesquioxane skeleton".

[Chemical formula 1]

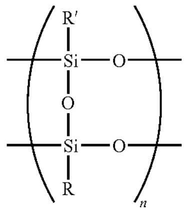

In chemical formula 1, R and R' each represent a functional group represented by, for example, chemical formula 2 or 3 below.

[Chemical formula 2]

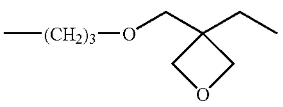

[Chemical formula 3]

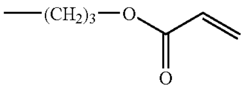

As shown in chemical formula 1, each of the Si atoms constituting silsesquioxane is bonded to three O atoms and R or R' to form a polymer. Therefore, silsesquioxane has a two- or three-dimensional structure.

Examples of the structure of a silsesquioxane polymer include a ladder structure represented by chemical formula 4, a random structure represented by chemical formula 5, and cage structures represented by chemical formulae 6 to 8.

[Chemical formula 4]

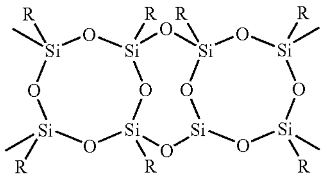

[Chemical formula 5]

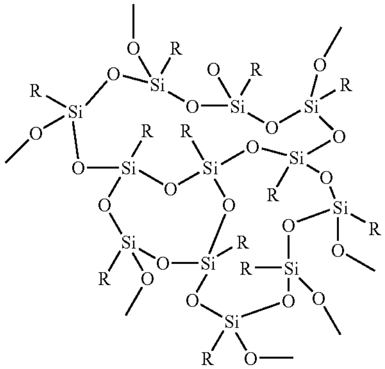

[Chemical formula 6]

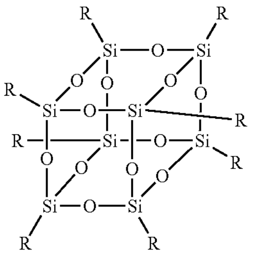

[Chemical formula 7]

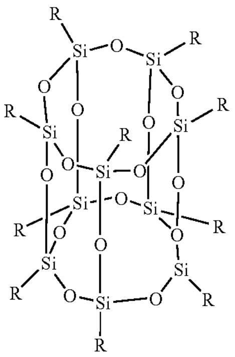

[Chemical formula 8)

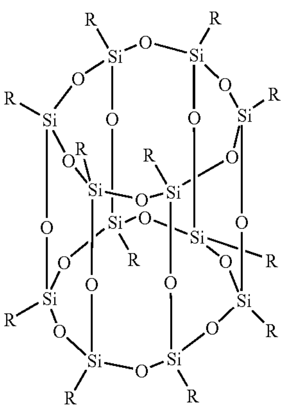

In manufacturing the powder magnetic core, heat treatment is performed after pressure molding or during pressure molding, and thus silsesquioxane is thermally cured in the heat treatment. The thermal curing of silsesquioxane forms a three-dimensional structure by polymerization of functional groups represented by R or R' in chemical formula 1.

A bond state of a Si atom can be measured by, for example, pyrolysis gas chromatography mass spectrometry (pyrolysis GCMS). Alternatively, the bond state can be examined by measuring a peak ratio between absorption peaks characteristic of Si—O and Si—C in infrared absorbing analysis and a Si/O ratio in elemental analysis. In the soft magnetic material of the present invention, 80% or more of a predetermined number of Si atoms constitute a silsesquioxane skeleton.

The average particle diameter of the metal magnetic particles 10 is preferably 30 μm to 500 μm. When the average particle diameter of the metal magnetic particles 10 is 30 μm or more, the coercive force can be decreased. When the average particle diameter is 500 μm or less, the eddy-current loss can be decreased. It is also possible to suppress a decrease in compressibility of a mixed powder during pressure molding. Therefore, the density of the molded product obtained by pressure molding is not decreased, thereby preventing difficulty in handling.

The average particle diameter of the metal magnetic particles 10 refers to the particle diameter at which the sum of the masses of particles measured from the smaller diameter side in a histogram of particle diameters is 50% of the total mass, i.e., a 50% particle diameter.

The metal magnetic particles 10 are composed of, for example, Fe, a Fe—Si alloy, a Fe—Al alloy, a Fe—N (nitrogen) alloy, a Fe—Ni (nickel) alloy, a Fe—C (carbon) alloy, a Fe—B (boron) alloy, a Fe—Co (cobalt) alloy, a Fe—P alloy, a Fe—Ni—Co alloy, a Fe—Cr (chromium), or a Fe—Al—Si alloy. The metal magnetic particles 10 may be composed of an elemental metal or an alloy. Further, a mixture of two or more of the elemental metal and alloys may be used.

The insulation coating 20 and the undercoating 30 function as an insulating layer between the metal magnetic particles 10. By covering the surface of each metal magnetic particle 10 with the insulation coating 20 and the undercoating 30, the electric resistivity ρ of the powder magnetic core obtained by pressure-molding the soft magnetic material can be increased. As a result, the flow of an eddy current between the metal magnetic particles 10 can be suppressed to decrease the eddy-current loss of the powder magnetic core.

The average thickness of the insulation coatings 20 is preferably 10 nm to 1 μm. When the average thickness of the insulation coatings 20 is 10 nm or more, the insulation between the metal magnetic particles 10 can be secured. When the average thickness of the insulation coatings 20 is 1 μm or less, shear fracture of the insulation coatings 20 during pressure molding can be prevented. In addition, the ratio of the insulation coatings 20 to the soft magnetic material is not excessively high, and thus a significant decrease in magnetic flux density of the powder magnetic core obtained by pressure-molding the soft magnetic material can be prevented.

The undercoating 30 improves the adhesion between the metal magnetic particles 10 and the insulation coatings 20 in addition to the function as an insulation layer between the metal magnetic particles 10. Further, the undercoating 30 improves the moldability of the soft magnetic material. Since an amorphous compound is excellent in deformation followingness, the amorphous compound can improve the moldability of the soft magnetic material.

The undercoating 30 is composed of an insulating amorphous compound and includes, for example, an amorphous compound of a phosphate, a borate, or an oxide of at least one element selected from the group consisting of Al, Si, Mg, Y, Ca, Zr, and Fe. Since these materials have excellent insulation and deformation followingness and have the sufficient effect of coupling a metal and an organic compound, the materials are suitable for the undercoating 30. The average thickness of the undercoating 30 is preferably 10 nm to 1 μm. When the average thickness of the undercoating 30 is 10 nm or more, breakage due to coating nonuniformity and physical damage in the step of coating with the undercoating 30 can be prevented. When the average thickness of the undercoating 30 is 1 μm or less, shear fracture of the undercoating 30 can be prevented in pressure molding. In addition, the ratio of the undercoatings 30 to the soft magnetic material is not excessively high, and thus a significant decrease in magnetic flux density of the powder magnetic core obtained by pressure-molding the soft magnetic material can be prevented.

Figure 3:
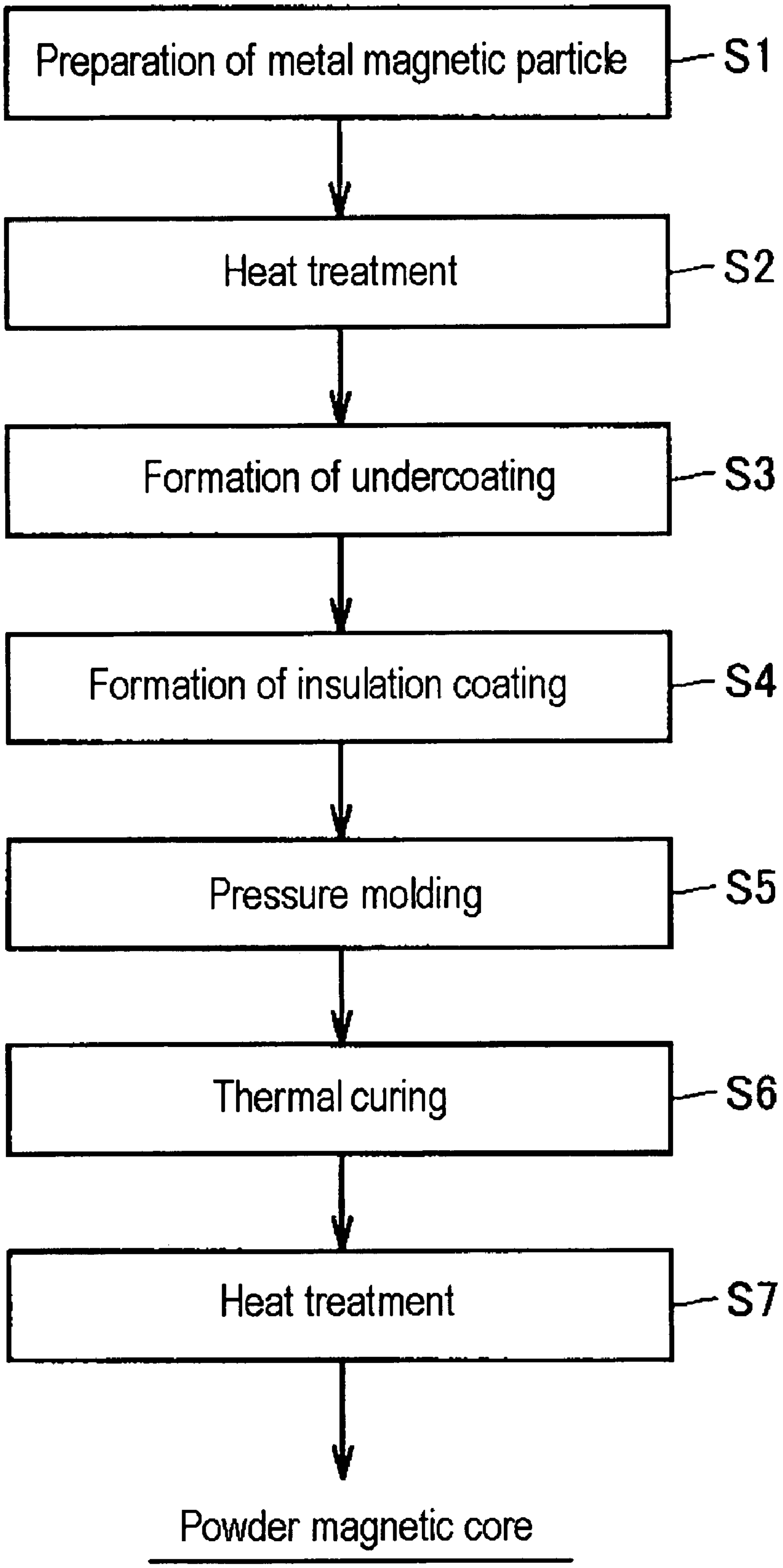
FIG. 3 is a drawing showing in order steps of a method for manufacturing a powder magnetic core according to an embodiment of the present invention.

Next, a method for manufacturing the soft magnetic material shown in FIG. 1 and a method for manufacturing the powder magnetic core shown in FIG. 2 will be described. FIG. 3 is a drawing showing in order steps of a method for manufacturing the powder magnetic core according to an embodiment of the present invention.

Referring to FIG. 3, first, the metal magnetic particles 10 composed of, for example, pure iron, a Fe—Si alloy, or a Fe—Co alloy are prepared (Step S1).

The metal magnetic particles 10 are manufactured by, for example, a gas atomization method or a water atomization method.

Next, the metal magnetic particles 10 are heat-treated at a temperature of 400° C. to lower than a temperature 100° C. lower than the melting point of the metal magnetic particles 10 (Step S2). The heat treatment temperature is more preferably 700° C. to a lower than a temperature 100° C. lower than the melting point of the metal magnetic particles 10. When disintegration is required because the metal magnetic particles 10 adhere to each other by the heat treatment, moldability is degraded by mechanical distortion due to disintegration, and thus heat treatment is preferably performed again at a temperature causing no adhesion. Before the heat treatment, many distortions (displacement and defects) are present in the metal magnetic particles 10. These distortions can be decreased by the heat treatment of the metal magnetic particles 10. The heat treatment may be omitted.

The undercoating 30 is formed on the surface of each of the metal magnetic particles 10 (Step 3). The undercoating 30 can be formed by, for example, phosphatizing the metal magnetic particles 10. The phosphatization forms the amorphous undercoating 30 composed of, for example, iron phosphate containing phosphorus and iron, aluminum phosphate, silicon phosphate (silicophosphate), magnesium phosphate, calcium phosphate, yttrium phosphate, or zirconium phosphate. Such a phosphate insulation coating can be formed by solvent spraying or sol-gel treatment using a precursor.

The undercoating 30 containing an oxide may be formed. As such an oxide-containing undercoating 30, an amorphous coating of an oxide insulator, such as silicon oxide, titanium oxide, aluminum oxide, or zirconium oxide, can be used. Such an undercoating can be formed by solvent spraying or sol-gel treatment using a precursor. The step of forming the undercoating may be omitted.

Next, the insulation coating 20 composed of silsesquioxane is formed on the surface of the undercoating 30 (Step S4). Specifically, a silsesquioxane compound or a silsesquioxane precursor in an amount of 0.01 to 0.2% by mass relative to the total mass of the metal magnetic particles 10 is dissolved in a xylene solvent. At this time, a heat curing accelerator may be further dissolved in the solvent. The amount of the heat curing accelerator dissolved is, for example, about 2% by mass relative to the total mass of the silsesquioxane compound or the silsesquioxane precursor. The insulation coating 20 composed of silsesquioxane is formed on the surface of the undercoating 30 by a wet method.

Together with the silsesquioxane compound or the silsesquioxane precursor, a resin, such as a polyethylene resin, a silicone resin, a polyamide resin, a polyimide resin, a polyamide-imide resin, an epoxy resin, a phenol resin, an acrylic resin, or a fluorocarbon resin, may be dissolved in the solvent. In this case, an insulation coating composed of silsesquioxane and such a resin is formed. However, even when an insulation coating composed of a material other than silsesquioxane is used, it is necessary to control the ratio of the silsesquioxane compound or the silsesquioxane precursor dissolved so that 80% of Si contained in the insulation coating constitutes a silsesquioxane skeleton.

Examples of a method for forming the insulation coating 20, other than the wet method, include a dry mixing method using a V-type mixer, a mechanical alloying method, a vibratory mill, a planetary ball mill, mechanofusion, a coprecipitation method, a chemical vapor deposition method (CVD method), a physical vapor deposition method (PVD method), a plating method, a sputtering method, an evaporation method, and a sol-gel method.

The soft magnetic material according to the embodiment shown in FIG. 1 is obtained by the above-described steps. In manufacturing the powder magnetic core shown in FIG. 2, the steps below are further performed.

Next, if required, a binder is mixed, and then the powder of the soft magnetic material is placed in a mold and molded under a pressure, for example, in the range of 800 MPa to 1500 MPa (Step S5). As a result, a molded product of the soft magnetic material is obtained by compacting. The atmosphere of pressure molding is preferably an inert gas atmosphere or a reduced-pressure atmosphere. In this case, oxidation of the mixed powder with atmospheric oxygen can be suppressed.

Next, the molded product is heat-treated in air at a temperature of, for example, 70° C. to 300° C., for 1 minute to 1 hour (Step S6). As a result, silsesquioxane is thermally cured to increase the strength of the molded product. Since silsesquioxane is thermally cured after pressure molding, pressure molding can be performed before deformation followingness is decreased by thermal curing of silsesquioxane, and thus the soft magnetic material with excellent moldability can be molded under pressure. When the heat treatment and pressure molding are simultaneously performed, the same effect can be obtained. In this case, the mold and the punch used for pressure molding are preferably heated to perform hot molding.

Next, the molded product obtained by pressure molding is heat-treated (Step S7). When the metal magnetic particles 10 are composed of pure iron, heat treatment is performed at a temperature of 550° C. to a temperature lower than the electric resistance reduction temperature of the insulation coating 20. Since many defects are present in the molded product after the pressure molding, these defects can be removed by heat treatment. In this heat treatment, non-Si bonds in a part of the silsesquioxane skeleton are bonded to each other to change the skeleton to a silica skeleton in which all bonds are bonded to Si atoms through oxygen atoms, thereby contributing to an improvement in heat resistance of the insulating film. The powder magnetic core of the embodiment shown in FIG. 2 is completed through the above-described steps.

In the soft magnetic material of the embodiment, 80% or more of Si contained in the insulation coating constitutes the silsesquioxane skeleton. Silsesquioxane has excellent insulation stability as compared with silicone having the same Si—O—Si chain. This will be described below.

Silsesquioxane has a structural formula represented by the above-described chemical formula 1. On the other hand, silicone has a structural formula represented by chemical formula 9 below, and inorganic silica has a structural formula represented by chemical formula 10 below.

[Chemical formula 9]

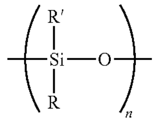

[Chemical formula 10]

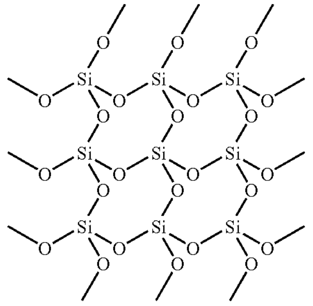

Referring to chemical formula 9, each Si atom constituting silicone is bonded to Si atoms through two oxygen atoms and bonded to R or R' to form a polymer. Therefore, silicone has a one-dimensional structure and has a lower density of a Si—O—Si chain than that of silsesquioxane.

Figure 4:
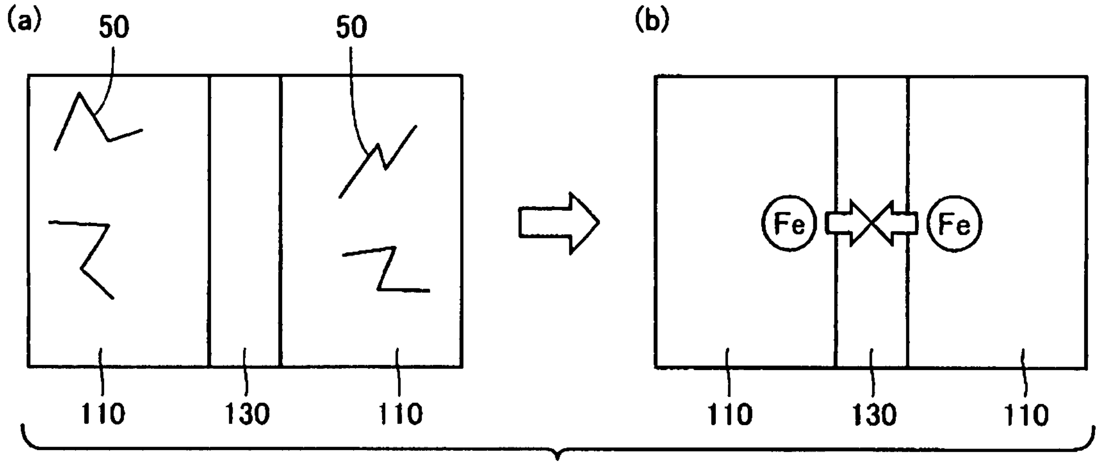
FIG. 4 is a drawing schematically showing the state of diffusion of Fe atoms in a soft magnetic material including only an undercoating.

The Si—O—Si chain has the effect of suppressing the diffusion of the constituent atoms of the metal magnetic particles, such as Fe, into the insulation coatings. FIG. 4 is a drawing schematically showing the state of diffusion of Fe atoms in a soft magnetic material including only an undercoating. Referring to FIG. 4(*a*), an undercoating 130 of a phosphate is formed on the surface of a metal magnetic particle 110 including distortions 50, and an insulation coating composed of a material having a Si—O—Si chain is not formed. In this case, only the undercoating 130 is present between the metal magnetic particles 110. In heat treatment of the soft magnetic material in order to remove the distortions 50, as shown in FIG. 4(*b*), Fe atoms of the metal magnetic particles 110 diffuse and enter the undercoating 130. As a result, the insulation coating is metallized to decrease insulation, thereby failing to secure insulation between the metal magnetic particles.

Figure 5:
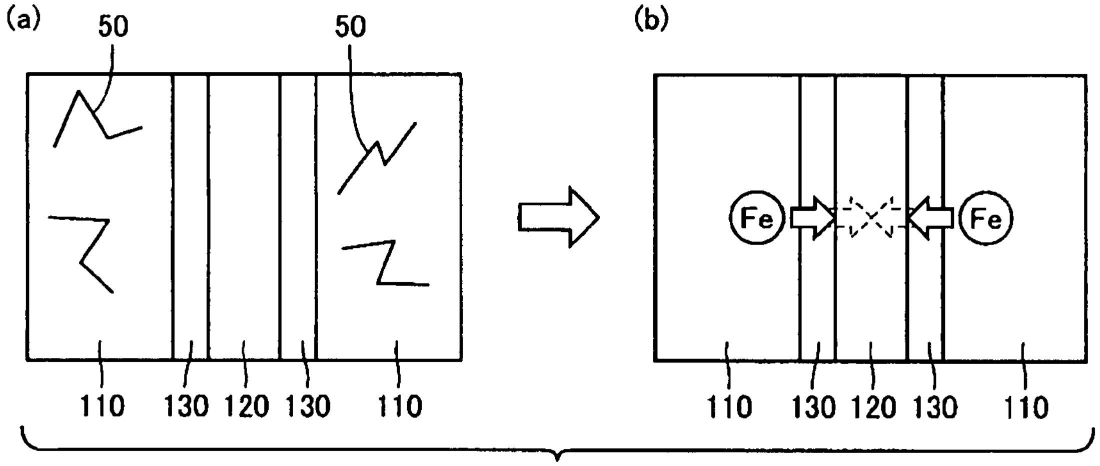
FIG. 5 is a drawing schematically showing the state of diffusion of Fe atoms in a soft magnetic material including an insulation coating composed of silicone.

FIG. 5 is a drawing schematically showing the state of diffusion of Fe atoms in a soft magnetic material including an insulation coating composed of silicone. Referring to FIG. 5(*a*), an undercoating 130 of a phosphate is formed on the surface of a metal magnetic particle 110 including distortions 50, and an insulation coating 120 composed of silicone is formed on the surface of the undercoating 130. In this case, the undercoating 130 and the insulation coating 120 are present between the metal magnetic particles 110. In heat treatment of the soft magnetic material in order to remove the distortions 50, as shown in FIG. 5(*b*), the diffusion of Fe atoms of the metal magnetic particles 110 is suppressed to some extent by the insulation coating 120. However, silicone has a low density of a Si—O—Si chain and many diffusion paths for Fe atoms. Therefore, when the heat treatment temperature is high, Fe atoms diffuse and enter the insulation coating 120 to decrease the insulation of the insulation coating. Also, silicone has a high content of organic components, and thus silicone is thermally decomposed by heat treatment to decrease the thickness of the insulation coating, thereby decreasing the insulation of the insulation coating. Further, a residue composed of carbon atoms as a main component is produced by carbonization, thereby further decreasing the insulation. As a result, the insulation between the metal magnetic particles 110 cannot be secured.

Figure 6:
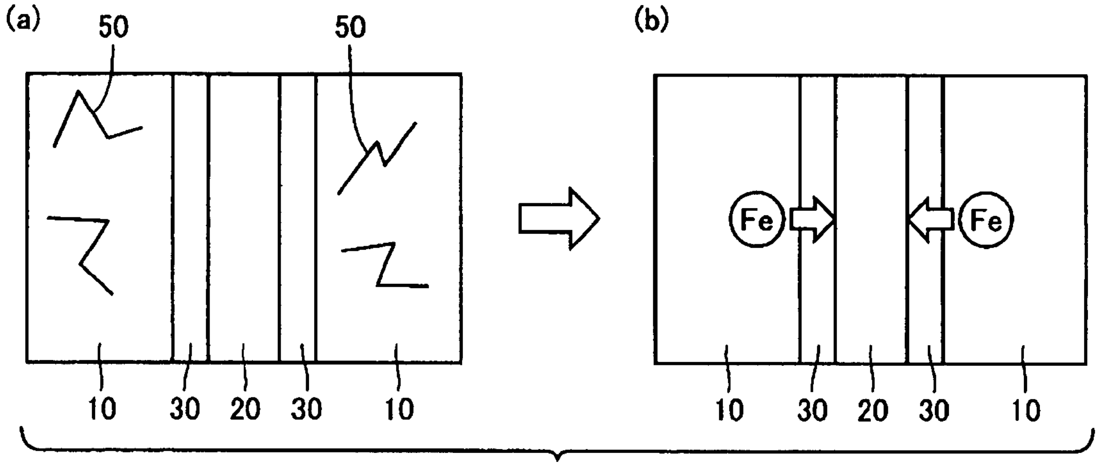
FIG. 6 is a drawing schematically showing the state of diffusion of Fe atoms in a soft magnetic material according to an embodiment of the present invention.

FIG. 6 is a drawing schematically showing the state of diffusion of Fe atoms in a soft magnetic material according to an embodiment of the present invention. Referring to FIG. 6(*a*), an undercoating 30 of a phosphate is formed on the surface of a metal magnetic particle 10 including distortions 50, and an insulation coating 20 composed of silsesquioxane is formed on the surface of the undercoating 30. In this case, the undercoating 30 and the insulation coating 20 are present between the metal magnetic particles 10. In heat treatment of the soft magnetic material in order to remove the distortions 50, as shown in FIG. 6(*b*), the diffusion of Fe atoms of the metal magnetic particles 10 is suppressed by the insulation coating 20. Since silsesquioxane has a higher density of a Si—O—Si chain than that of silicone, even when the heat treatment temperature is high, Fe atoms can be suppressed from diffusing and entering the insulation coating 20. Also, silsesquioxane has lower contents of organic components than silicone, and the thickness of the insulation coating is little decreased in heat treatment, and a carbon residue is little produced. As a result, the distortions 50 can be removed while securing the insulation between the metal magnetic particles 10.

In Table I, the properties of silicone, silsesquioxane, and inorganic 10 silicon are summarized. In Table I, A represents "very excellent"; B, "excellent"; C, "slightly poor"; and D, "poor".

TABLE I

| | Silicone | Silsesquioxane | Inorganic silica |
|---|---|---|---|
| Composition formula | $[(R_2SiO)_n]$ | $[(RSiO_{1.5})_n]$ | $[SiO_2]$ |
| Structure | One-dimensional chain | Two-dimensional chain | Crystal |
| Insulation stability | C | B | A |
| Deformation followingness | B (before curing) C (after curing) | B (before curing) D (after curing) | D |
| Hardness after curing | C | B | A |
| Si—O chain density after decomposition | C | B | A |

Referring to Table I, silsesquioxane is superior in insulation stability and density after curing to silicone because silsesquioxane is a higher density of a Si—O—Si chain. With respect to deformation followingness, silsesquioxane before thermal curing and silicone have the same degree of deformation followingness. Inorganic silica is more excellent than silsesquioxane in insulation stability and density of a Si—O—Si chain, but is disadvantageous in that the deformation followingness is significantly low. Therefore, when inorganic silica is used for an insulation coating, the insulation coating is broken by pressure molding of a soft magnetic material, and thus inorganic silica is unsuitable as a material for the insulation coating. Further, inorganic silica interferes with plastic deformation of metal magnetic materials, and thus the density of the resulting powder magnetic core is decreased, thereby decreasing magnetic permeability and increasing the iron loss.

In the soft magnetic material, the powder magnetic core, the method for manufacturing the soft magnetic material, and the method for manufacturing the powder magnetic core according to the embodiments of the present invention, 80% or more of Si contained in the insulation coating 20 constitutes a silsesquioxane skeleton, thereby improving the heat resistance of the insulation coating 20. As a result, it is possible to decrease the hysteresis loss while suppressing an increase in eddy-current loss.

In addition, the ability of suppressing the diffusion of Fe atoms into the insulation coating 20 is improved, and thus, even when the thickness of the insulation coating 20 is decreased, the heat resistance of the insulation coatings between the metal magnetic particles 10 can be secured. Therefore, the density of the powder magnetic core can be increased, thereby decreasing the hysteresis loss and improving magnetic permeability.

Further, since silsesquioxane after curing has higher hardness that that of silicone after curing, a powder magnetic core with sufficient strength can be obtained, and handleability in a post-step can be improved.

EXAMPLE 1

In this example, the effect of a silsesquioxane skeleton constituted by 80% or more of Si contained in an insulation coating was examined. Specifically, pure iron with a purity of 99.8% by mass was powdered by an atomization method to prepare a plurality of metal magnetic particles. Next, the metal magnetic particles were immersed in an aqueous iron phosphate solution to form an undercoating of iron phosphate on the surface of each metal magnetic particle. Next, each metal magnetic particle was coated with an insulation coating while the ratios by mass of silsesquioxane to silicone was changed between 0% by mass to 100% by mass. Oxetane silsesquioxane (OX-SQ: manufactured by Toagosei Co. Ltd.) as silsesquioxane, a thermal cationic initiator (San-Aid SI-100L manufactured by Sanshin Chemical Industry Co., Ltd.), and non-solvent silicone resin (TSE3051 manufactured by Toshiba GE Silicone Co., Ltd.) as silicone were used for preparing a xylene solution. The total amount of coating was 0.1% by mass to 0.2% by mass relative to the total weight of the metal magnetic particles. The ratio of the thermal cationic initiator was 2% by mass relative to silsesquioxane. By using the solution, the insulation coating was formed on the surface of the undercoating by a wet method. Next, xylene was evaporated by drying, and then the resulting soft magnetic material was pressure-molded under a press surface pressure of 800 MPa to 1500 MPa to produce a molded product. Then, the molded product was heat-treated in air at a temperature in the range of 70° C. to 300° C. for 1 hour to thermally cure the insulation coatings. Then, the molded product was heat-treated in a nitrogen atmosphere for 1 hour while the temperature was changed in the range of 400° C. to 650° C. to prepare powder magnetic cores of samples 1 to 10.

Then, a wire was wound on each of the resulting powder magnetic cores to prepare a sample for measuring magnetic properties. An iron loss was measured using an AC BH curve tracer. In measuring an iron loss, an excitation magnetic flux density was 10 kG (=1 T (Tesla)), and the measurement frequency was 50 to 1000 Hz. Further, an eddy-current loss and a hysteresis loss were calculated from changes in the iron loss with frequency. Namely, an eddy-current loss and a hysteresis loss were calculated by fitting a frequency curve of the iron loss by a least-square method according to the three equations below and calculating a hysteresis loss coefficient and an eddy-current loss coefficient.

$$(\text{Iron loss})=(\text{hysteresis loss coefficient})\times(\text{frequency})+(\text{eddy-current loss coefficient})\times(\text{frequency})^2$$

$$(\text{Hysteresis loss})=(\text{hysteresis loss coefficient})\times(\text{frequency})$$

$$(\text{Eddy-current loss})=(\text{eddy-current loss coefficient})\times(\text{frequency})^2$$

Table II shows the measured eddy-current loss We (W/kg), hysteresis loss Wh (W/kg), and iron loss W (W/kg).

TABLE II

| Sample | Ratio of silsesquioxane | 400° C. | | | 450° C. | | | 500° C. | | | 550° C. | | | 600° C. | | | 650° C. | | | |
|---|---|---|---|---|---|---|---|---|---|---|---|---|---|---|---|---|---|---|---|---|
| No. | (% by mass) | Wh | We | W | Wh | We | W | Wh | We | W | Wh | We | W | Wh | We | W | Wh | We | W | Remarks |
| 1 | 0 | 108 | 23 | 131 | 101 | 25 | 126 | 92 | 29 | 121 | 86 | 38 | 124 | 67 | 88 | 155 | — | — | *) | Comparative Example |
| 2 | 10 | 109 | 22 | 131 | 100 | 24 | 124 | 90 | 26 | 116 | 85 | 35 | 120 | 66 | 72 | 138 | — | — | *) | Comparative Example |
| 3 | 20 | 109 | 20 | 129 | 102 | 21 | 123 | 91 | 24 | 115 | 81 | 36 | 117 | 61 | 44 | 105 | 71 | 205 | 276 | Comparative Example |
| 4 | 30 | 109 | 23 | 132 | 103 | 23 | 126 | 90 | 25 | 115 | 79 | 32 | 111 | 63 | 50 | 113 | 83 | 147 | 230 | Comparative Example |
| 5 | 40 | 112 | 20 | 132 | 96 | 22 | 118 | 90 | 24 | 114 | 80 | 33 | 113 | 63 | 46 | 109 | 68 | 167 | 235 | Comparative Example |
| 6 | 50 | 110 | 21 | 131 | 99 | 22 | 121 | 92 | 21 | 113 | 81 | 29 | 110 | 61 | 39 | 100 | 59 | 158 | 217 | Comparative Example |
| 7 | 60 | 106 | 23 | 129 | 100 | 20 | 120 | 91 | 22 | 113 | 81 | 26 | 107 | 62 | 38 | 100 | 61 | 98 | 159 | Comparative Example |

TABLE II-continued

| Sample No. | Ratio of silsesquioxane (% by mass) | 400° C. | | | 450° C. | | | 500° C. | | | 550° C. | | | 600° C. | | | 650° C. | | | Remarks |
|---|---|---|---|---|---|---|---|---|---|---|---|---|---|---|---|---|---|---|---|---|
| | | Wh | We | W | Wh | We | W | Wh | We | W | Wh | We | W | Wh | We | W | Wh | We | W | |
| 8 | 70 | 108 | 24 | 132 | 102 | 22 | 124 | 91 | 23 | 114 | 82 | 28 | 110 | 61 | 33 | 94 | 55 | 75 | 130 | Comparative Example |
| 9 | 80 | 109 | 23 | 132 | 101 | 20 | 121 | 91 | 20 | 111 | 80 | 23 | 103 | 64 | 24 | 88 | 57 | 58 | 115 | Example of this invention |
| 10 | 90 | 111 | 21 | 132 | 98 | 19 | 117 | 90 | 22 | 112 | 79 | 21 | 100 | 61 | 20 | 81 | 60 | 63 | 123 | Example of this invention |
| 11 | 100 | 107 | 22 | 129 | 99 | 22 | 121 | 90 | 21 | 111 | 82 | 21 | 103 | 61 | 22 | 83 | 59 | 55 | 114 | Example of this invention |

*): excessive iron loss

Referring to Table II, in heat treatment at a low temperature of 400° C. to 500° C., the eddy-current losses We and the hysteresis losses Wh of samples 1 to 10 are not much different. However, in heat treatment at a high temperature of 550° C. or more, the eddy-current losses We of samples 1 to 8 as comparative examples are increased, while the hysteresis losses of samples 9 to 11 of examples of the present invention are decreased while suppressing increases in the eddy-current loss We. In particular, in heat treatment at a temperature of 600° C., the iron losses W of samples 9, 10, and 11 are significantly decreased to 88 W/kg, 81 W/kg, and 83 W/kg, respectively. These results indicate that according to the present invention, the hysteresis loss can be decreased while suppressing the eddy-current loss.

It should be considered that the above-described embodiments and examples are illustrative only and not limitative. The scope of the present invention is shown by the claims, not by the embodiments and examples, and is intended to include meanings equivalent to the claims and any modification and change within the scope of the claims.

INDUSTRIAL APPLICABILITY

A soft magnetic material, a powder magnetic core, a method for manufacturing a soft magnetic material, and a method for manufacturing a powder magnetic core of the present invention are used for, for example, motor cores, solenoid valves, reactors, and general electromagnetic parts.

The invention claimed is:

1. A soft magnetic material comprising a plurality of composite magnetic particles each including a pure iron particle and an insulation coating covering the surface of the pure iron particle, wherein the insulation coating contains Si, and 80% or more and 90% or less of Si contained in the insulation coating constitutes a silsesquioxane skeleton and the rest of Si contained in the insulation coating constitutes a silicone skeleton.

2. The soft magnetic material according to claim 1, wherein the average thickness of the insulation coating is about 10 nm to about 1 μm.

3. The soft magnetic material according to claim 1, wherein each of the plurality of composite magnetic particles further includes an undercoating formed between the pure iron particle and the insulation coating, wherein the undercoating is composed of an insulating amorphous compound.

4. The soft magnetic material according to claim 3, wherein the undercoating includes an amorphous compound of a phosphate of at least one selected from the group consisting of Al, Si, Mg, Y, Ca, Zr, and Fe, an amorphous compound of a borate thereof, or an amorphous compound of an oxide thereof.

5. The soft magnetic material according to claim 3, wherein the average thickness of the undercoating is about 10 nm to about 1 μm.

6. A powder magnetic core manufactured using the soft magnetic material according to claim 1.

* * * * *